United States Patent
Sasaki (10) Patent No.: US 8,453,521 B2
(45) Date of Patent: Jun. 4, 2013

(54) BICYCLE FORCE SENSING DEVICE

(75) Inventor: Bungo Sasaki, Osaka (JP)

(73) Assignee: Shimano Inc., Osaka (JP)

( * ) Notice: Subject to any disclaimer, the term of this patent is extended or adjusted under 35 U.S.C. 154(b) by 239 days.

(21) Appl. No.: 13/104,165

(22) Filed: May 10, 2011

(65) Prior Publication Data

US 2012/0285264 A1    Nov. 15, 2012

(51) Int. Cl.
*G01L 1/22*    (2006.01)
*G01L 5/12*    (2006.01)

(52) U.S. Cl.
USPC .................................. 73/862.49; 73/862.045

(58) Field of Classification Search
USPC ......................................... 73/862.045, 862.49
See application file for complete search history.

(56) References Cited

U.S. PATENT DOCUMENTS

| | | |
|---|---|---|
| 4,112,751 A | 9/1978 | Grunbaum |
| 4,145,919 A | 3/1979 | Bauer et al. |
| 4,341,122 A | 7/1982 | Lechler et al. |
| 5,140,849 A | 8/1992 | Fujita et al. |
| 5,952,587 A | 9/1999 | Rhodes et al. |
| 6,490,935 B1 | 12/2002 | Joki et al. |
| 6,644,135 B1 | 11/2003 | Kishimoto et al. |
| 6,920,801 B2 | 7/2005 | Van Leeuwen et al. |
| 6,988,427 B2 * | 1/2006 | Yamanaka .................... 74/594.1 |
| 7,516,677 B2 | 4/2009 | Watarai et al. |
| 7,806,006 B2 * | 10/2010 | Phillips et al. ........... 73/862.338 |
| 8,117,923 B2 * | 2/2012 | Sasaki ......................... 73/862.49 |
| 2010/0282001 A1 | 11/2010 | Sasaki |

FOREIGN PATENT DOCUMENTS

| | | |
|---|---|---|
| EP | 1 361 822 B1 | 5/2008 |
| JP | 11-258078 A | 9/1999 |

* cited by examiner

*Primary Examiner* — Lisa Caputo
*Assistant Examiner* — Octavia D. Hollington
(74) *Attorney, Agent, or Firm* — Global IP Counselors (57) ABSTRACT

A bicycle force sensing device is basically provided with an attachment member, a translation detecting structure and an orientation detector. The attachment member is configured to be mounted to a bicycle bottom bracket hanger and is configured to receive and rotatably support a crank axle. The translation detecting structure is coupled to the attachment member such that the translation detecting structure senses strain on the attachment member in a first strain measurement direction and in a second strain measurement direction that is nonparallel to the first strain measurement direction. The orientation detector is coupled to the attachment member such that the orientation detector detects an orientation of the attachment member.

15 Claims, 8 Drawing Sheets

BICYCLE FORCE SENSING DEVICE

BACKGROUND

1. Field of the Invention

This invention generally relates to a bicycle force sensing device. More specifically, the present invention relates to a bicycle force sensing device for sensing a pedaling force being applied to a crank axle.

2. Background Information

Bicycles are sometimes equipped with a force sensor for detecting a force acting on the bicycle crank axle. For example, in U.S. Pat. No. 7,516,677 (assigned to Shimano Inc.), a cylindrical torsion-detecting sleeve member (force sensor unit) is provided on a crank axle for detecting a torque applied to the crank axle. Another example of a force sensor for detecting force acting on the bicycle crank axle is disclosed in EP Patent Publication No. 1,361,822. In this patent publication, sensors are positioned between a radial inner surface of the bottom bracket tube and a radially extending outer surface of an annular member that surrounds one of the crank axle bearings. With these arrangements, the strain sensors have to be orientated in a prescribed orientation in order to accurately measure the force acting on the bicycle crank axle. Thus, with these arrangements, a main body is fixed to an adaptor by bolts, and then a user fixes the adaptor to a bicycle bottom bracket and adjusts the orientation of the main body after adaptor has been fixed to the bicycle bottom bracket.

SUMMARY

One object of the present invention is to provide a bicycle force sensing device that that is easily installed without requiring a specific orientation of the bicycle force sensing device.

The foregoing object can basically be attained by providing a bicycle force sensing device that basically comprises an attachment member, a translation detecting structure and an orientation detector. The attachment member is configured to be mounted to a bicycle bottom bracket hanger and is configured to receive and rotatably support a crank axle. The translation detecting structure is coupled to the attachment member such that the translation detecting structure senses strain on the attachment member in a first strain measurement direction and in a second strain measurement direction that is nonparallel to the first strain measurement direction. The orientation detector is coupled to the attachment member such that the orientation detector detects an orientation of the attachment member.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
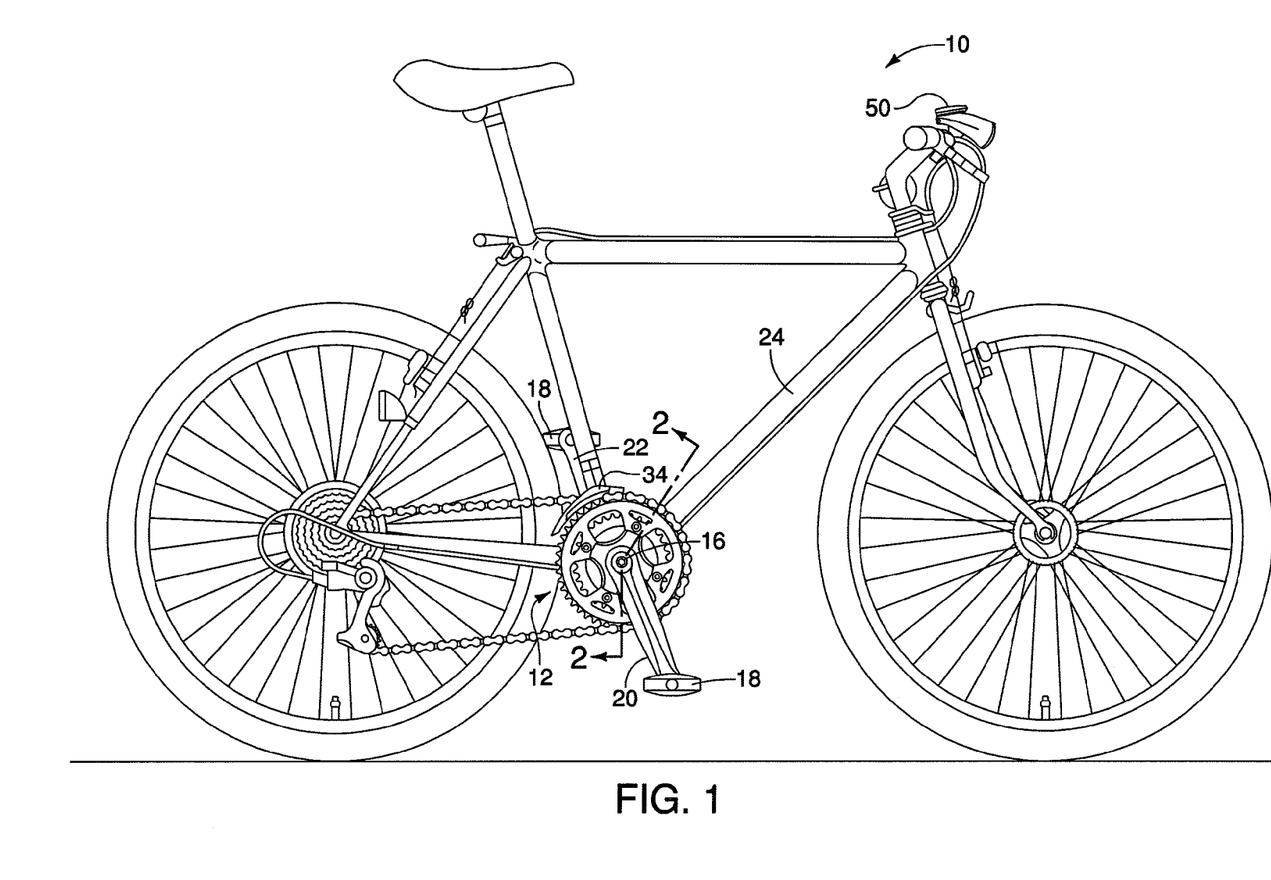
FIG. 1 is a side elevational view of a bicycle showing a frame with a bottom bracket tube equipped with a bicycle force sensing device in accordance with a first embodiment.
Figure 2:
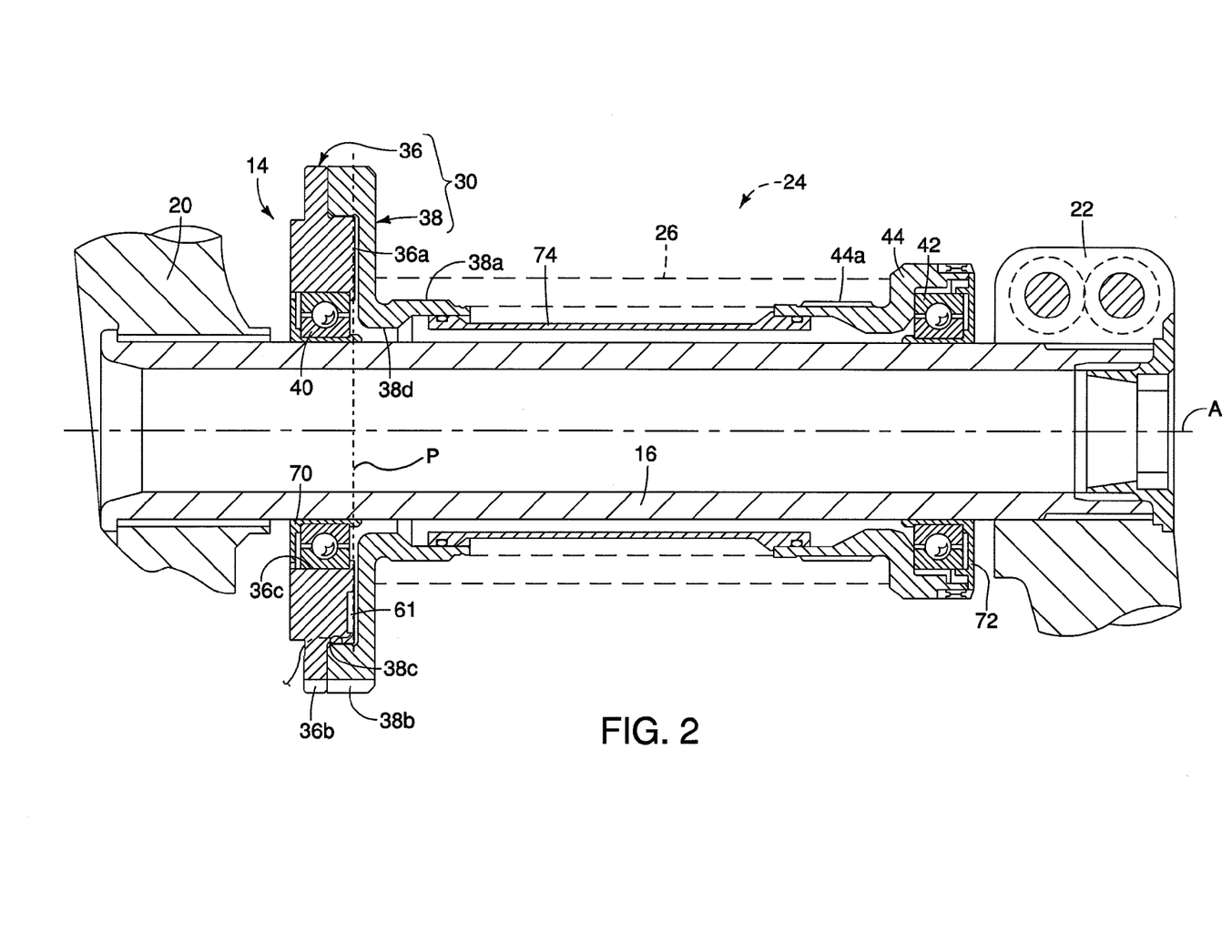
FIG. 2 is a cross-sectional view of the bottom bracket tube of the bicycle taken along the section line 2-2 in FIG. 1 showing the bicycle force sensing device mounted on the bottom bracket in accordance with the first embodiment.
Figure 3:
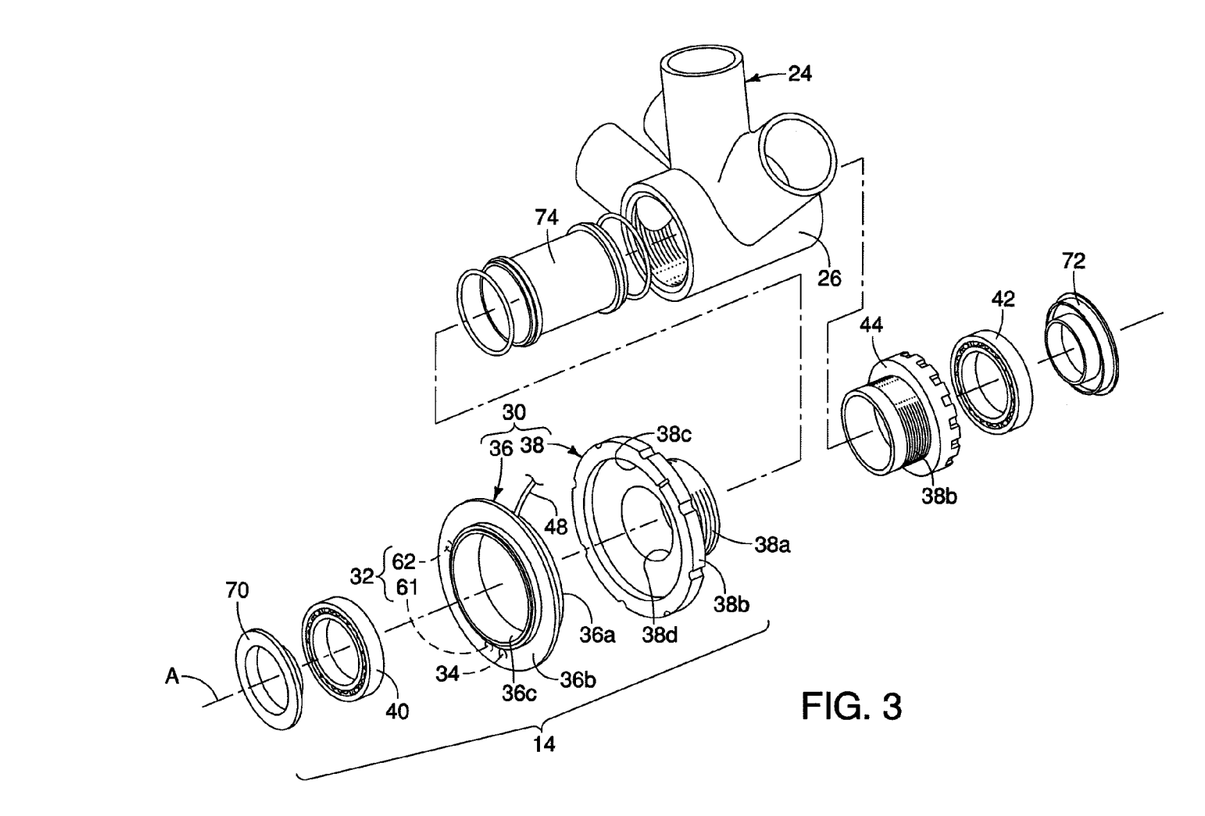
FIG. 3 is an exploded perspective view of selected parts of the front crank assembly and the bicycle force sensing device with respect to the bottom bracket hanger in accordance with the first embodiment.

Referring initially to FIGS. 1 to 3, a bicycle 10 is illustrated that has a crank axle assembly 12 that is equipped with a bicycle force sensing device 14 (shown in FIGS. 2 and 3) in accordance with a first embodiment. As shown in FIGS. 2 and 3, the force sensing device 14 that is configured to sense the force applied by a cyclist (not shown) on a crank axle 16 (shown in FIG. 2) of the crank axle assembly 12 as the cyclist applies force on a pair of bicycle pedals 18 (shown in FIG. 1) via a pair of crank arms 20 and 22. The bicycle pedals 18 include conventional binding devices configured to releasably retain cleats on cycling shoes (not shown) in a conventional manner. Specifically, when mating cycling shoes are retained by the bicycle pedals 18, rotary power produced by the cyclist (not shown) is transmitted from the cycling shoes to the bicycle pedals 18 during both downward cycling motion and upward cycling motion.

As seen in FIGS. 2 and 3, the crank axle assembly 12 is mounted to a bicycle frame 24 of the bicycle 10. In particular, the crank axle assembly 12 is mounted to a bottom bracket hanger 26 of the frame 24. The bottom bracket hanger 26 is configured to receive the crank axle 16 therein to rotatably support the crank axle 16. The crank axle 16 is a hollow cylindrical member that is rotatably mounted to extend through the bottom bracket hanger 26, as shown in FIG. 2. The right crank 20 is fixed to the right end of the crank axle 16, while the left crank 22 is detachably fixed to the left end of the crank axle 16. The crank axle 16 is configured to rotate about a rotation axis A that extends through the center of the crank axle 16. Thus, the rotation axis A is also a center axis of the crank axle 16 and the bottom bracket hanger 26. While the crank axle 16 is illustrated as hollow cylindrical member, the crank axle 16 is not limited to a hollow cylindrical member. For example, it is also acceptable for the crank axle to be a solid rod with the crank arms are fixed to the crank axle by bolts. The frame 24 can be made of metallic tube sections welded together, or alternatively, can be made of composite materials such that the tubes of the frame 24 are fixed to one another by resin and/or carbon fiber materials. Since the frame 24 is a conventional feature of the bicycle 10, further description of the frame 24, other than the bottom bracket hanger 26 has been omitted for the sake of brevity.

The bottom bracket hanger 26 is a hollow tubular element with open ends. The bottom bracket hanger 26 is sometimes referred to as a bottom bracket tube. The bottom bracket hanger 26 is configured to support the crank axle 16 and elements associated with the crank axle 16 in a relatively conventional manner. Each of the open ends of the bottom bracket hanger 26 preferably include internal machine threads that supports the force sensing device 14 in a manner described in greater detail below. Alternatively, each of the open ends of the bottom bracket hanger 26 can be configured without machine threads to receive crank axle supporting elements via a press-fit arrangement.

A description of the bicycle force sensing device 14 is now provided with specific reference to FIGS. 4 to 8. With the bicycle force sensing device 14 of the illustrated embodiment, the user does not have to adjust the bicycle force sensing device 14 to any prescribed orientation, after the force sensing device 14 is fixed to the bicycle frame 24. Rather, as discussed below, the bicycle force sensing device 14 can be easily calibrated regardless of the orientation of the bicycle force sensing device 14 with respect to the bottom bracket hanger 26 of the frame 24.

Figure 5:
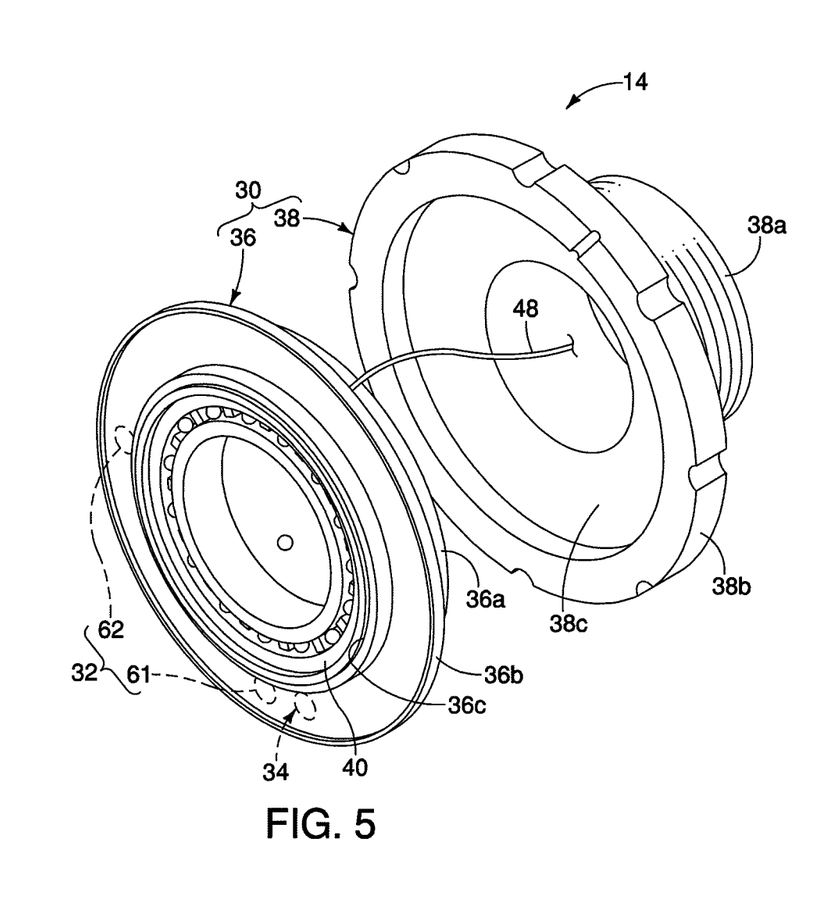
FIG. 5 is an exploded perspective view of the main body and the adaptor member in accordance with the first embodiment.

As seen best seen in FIGS. 3 and 5, the bicycle force sensing device 14 basically includes an attachment member 30, a translation detecting structure 32 and an orientation detector 34. The attachment member 30 is configured to be non-movably mounted to the bottom bracket hanger 26. In this first illustrated embodiment, the attachment member 30 is a two piece structure that includes a main body 36 and an adaptor 38. The main body 36 is fixedly secured to the adaptor 38 such that the main body 36 and the adaptor 38 form an integrated unit. In the first illustrated embodiment, the attachment member 30 is also provided with a first bearing unit 40 that is press fitted into the main body 36.

As seen in FIG. 3, the bottom bracket hanger 26 is also provided with a second bearing unit 42 so that the bottom bracket hanger 26 is configured to receive and rotatably support the crank axle 16. The second bearing unit 42 is fixedly secured to the bottom bracket hanger 26 by an adaptor 44. In the first illustrated embodiment, the adaptor 44 is provided with an external thread 44a for fixedly securing the second bearing unit 42 to the bottom bracket hanger 26. The second bearing unit 42 is press fitted into the adaptor 44.

In the first illustrated embodiment, the adaptor 38 of the attachment member 30 constitutes a first portion that is configured to be attached to the bicycle bottom bracket hanger 26, while the main body 36 constitutes a second portion having the translation detecting structure 32 attached thereto. The main body 36 (e.g., the second portion) is configured to be disposed outside of the bicycle bottom bracket hanger 26 as best seen in FIG. 2. The main body 36 also supports the first bearing unit 40 such that the first bearing unit 40 is disposed outside of the bicycle bottom bracket hanger 26 as best seen in FIG. 2. However, it is also acceptable to configure the main body 36 such that the first bearing unit 40 is disposed inside the bicycle bottom bracket hanger 26 as needed and/or desired.

In the first illustrated embodiment, the main body 36 and the adaptor 38 are fixed together by adhesive and/or a press fit. Alternatively, the main body 36 can be attached to the adaptor 38 by welding or bolting the two parts together. It is also possible to make the main body 36 and the adaptor 38 as a one-piece, unitary member if needed and/or desired. In any event, the main body 36 supports the translation detecting structure 32 and the orientation detector 34 on the adaptor 38 and the first bearing unit 40.

As mentioned above, the adaptor 38 is configured to be fixedly secured to the bottom bracket hanger 26. In the first illustrated embodiment, the adaptor 38 is provided with a tubular mounting portion 38a with an external thread for fixedly securing the bicycle force sensing device 14 to the bottom bracket hanger 26. Alternatively, the adaptor 38 can be attached to the bottom bracket hanger 26 by press fit arrangement or the like. The adaptor 38 also includes an annular flange 38b extending radially from the tubular mounting portion 38a. The annular flange 38b has a recessed area 38c for receiving the main body 36 therein. The adaptor 38 supports the main body 36 in a radial direction relative to the rotation axis A and in directions parallel to the rotational axis A. As shown in FIG. 2, the adaptor 38 is installed to the bottom bracket hanger 26 such that the crank axle 16 extends through a crank axle receiving opening 38d of the adaptor 38 and such that the annular flange 38b of the adaptor 38 and the main body 36 are both located outside of the bottom bracket hanger 26. Thus, the force sensing device 14 is primarily located between the bottom bracket hanger 26 and the crank arm 20. The adaptor 38 is preferably made of a metallic material, such as steel, aluminum, titanium or a suitable alloy with appropriate rigidity and strength.

In the first illustrated embodiment, the main body 36 has an inner portion 36a that defines a bearing receiving opening in which the first bearing unit 40 is retained therein by a press fit arrangement. The main body 36 is preferably made of a metallic material, such as steel, aluminum, titanium or a suitable alloy with appropriate rigidity and strength. The thickness and overall dimensions of the main body 36 are determined by the anticipated forces that will act on the crank axle 16, the materials used and the size and type of bicycle to be equipped with the force sensing device 14. The main body 36 further includes an outer portion 36b that overlies and contacts the annular flange 38b of the adaptor 38, and a bearing receiving opening 36c that receives the first bearing unit 40 as seen in FIG. 2. The first bearing unit 40 is press fitted into the bearing receiving opening 36c such that the outer race of first bearing unit 40 is fixed to the main body 36 while the inner race of the first bearing unit 4 turns with the crank axle 16. The translation detecting structure 32 is disposed in the intermediate area between the inner and outer portions 36a and 36b for detecting the strain occurring in the main body 36 as a result of the rotation of the crank axle 16. In this first illustrated embodiment, the intermediate area of the main body 36 between the inner and outer portions 36a and 36b is a plain body type that is free of any through openings. However, the main body 36 can be configured as a bridge body type in which the intermediate area of the main body 36 between the inner and outer portions 36a and 36b is provided with through openings. By configuring the main body 36 as a bridge body type results in the main body 36 being sensitive to torque inputs since the bridge body type more readily changes its shape as compared to the plain body type.

Figure 4:
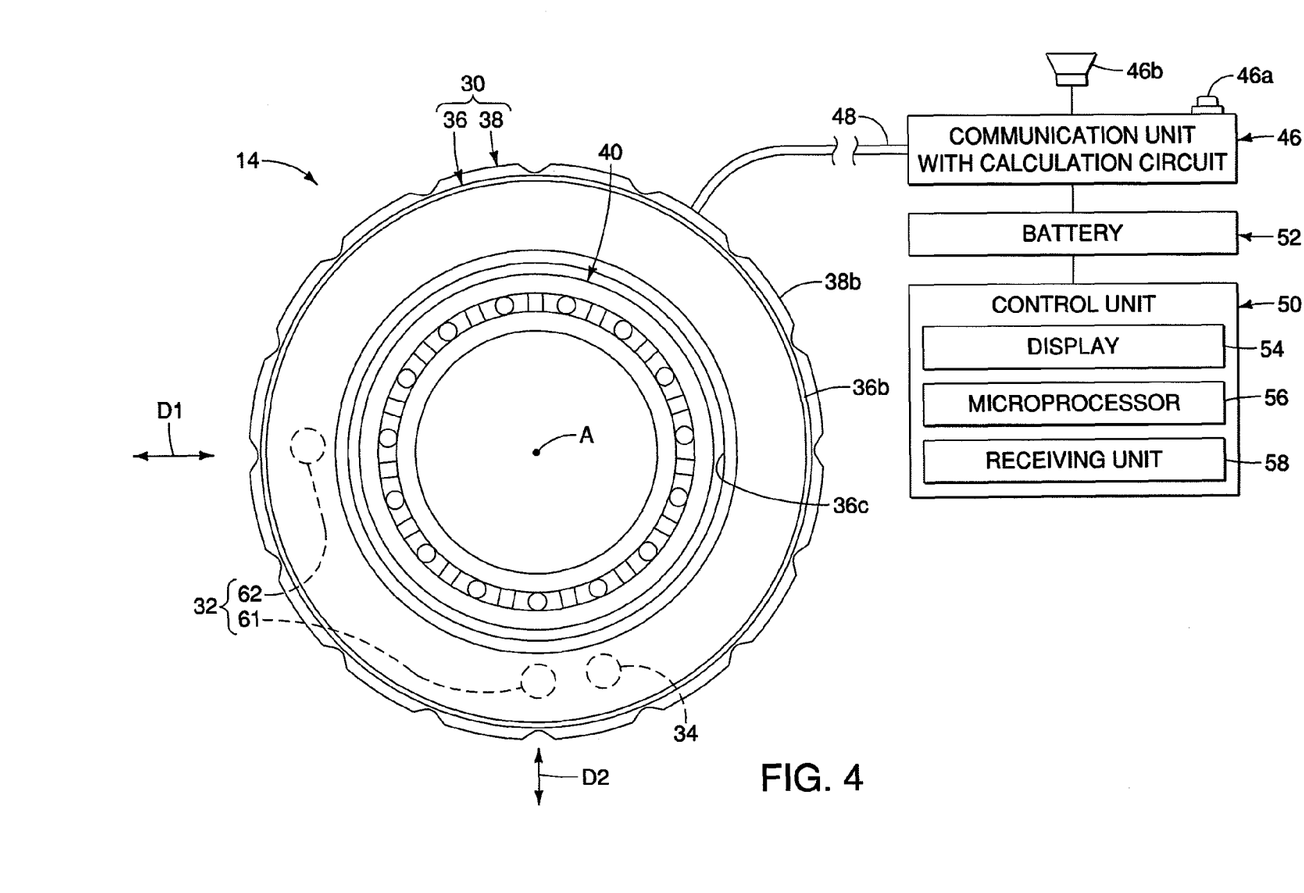
FIG. 4 is a side elevational view of the bicycle force sensing device shown with the cover removed and the communication unit and the control unit shown as a simplified block diagram in accordance with the first embodiment.

As seen in FIG. 4, the bicycle force sensing device 14 also includes a communication unit 46 that is electrically connected to the translation detecting structure 32 and the orientation detector 34 by an electrical wire 48 for receiving electrical signals from the translation detecting structure 32 and the orientation detector 34. In other words, the communication unit 46 is operatively coupled to the translation detecting structure 32 and the orientation detector 34 such that signals from the translation detecting structure 32 and the orientation detector 34 are received by the communication unit 46. The communication unit 46 is separate from the attachment member 30 in this first embodiment. However, the communication unit 46 can be supported on the attachment member 30 if needed and/or desired.

The communication unit 46 includes a calculation circuit that receives signals from the translation detecting structure 32 for calculating the strain being applied to the main body 36 due to the pedaling force being applied to the crank axle 16. The calculation circuit of the communication unit 46 also receives signals from the orientation detector 34 for determining the strain measurement directions of the translation detecting structure 32. Preferably, the communication unit 46 has a switch 46a (e.g., a push button) for initiating setup of the translation detecting structure 32 by the calculation circuit based on the signals from the orientation detector 34. Also, optionally, the communication unit 46 has a notification device 46b (e.g., a visual notification device such as a light or an audible notification device such as speaker) for notifying the user when a setup operation in the setup process of the translation detecting structure 32 has been completed. The switch 46a and the notification device 46b can be provided on the communication unit 46 or on some other portion of the bicycle 10.

As seen in FIG. 4, the bicycle 10 further includes (among other things) a control unit 50 and a battery 52. The control unit 50 is attached to a forward section of the frame 24, such as the handlebar. The control unit 50 receives signals and/or controls various components of the bicycle 10 as needed and/or desired. For example, the control unit 50 can receive the RPM data from a cadence sensor, gear position data from a gear positioning sensor and force data from the translation detecting structure 32 via the communication unit 46. Using this data, the control unit 50 can control an automatic shifting system.

The force sensing device 14 is operatively connected to the control unit 50 and the battery 52. As mentioned below, the control unit 50 can be configured to determine the torque being applied to the crank axle 16 using strain measurement signals provided by the force sensing device 14, or the communication unit 46 can determine the torque being applied to the crank axle 16 using strain measurement signals provided by the force sensing device 14 and then communicate the calculation results to the control unit 50. The calculations can be performed in any desired manner.

For example, the strain measurement signals provided by the force sensing device 14 can be used to determine the torque being applied to the crank axle 16 in the same manner as in U.S. Patent Publication No. 2010/0282001. For example, the communication unit 46 or the control unit 50 can calculate the power using the following formula: $P = Fc \cdot Vc$ where:
Vc is chain speed $$Vc = \omega \cdot Gr$$

where:
ω is rotation speed (calculated based on signal from a cadence sensor)
Gr is the semidiameter of an active chain ring (based on signal from a gear positioning sensor)

The control unit 50 can calculate an average torque T (per rotation) using the following formula: $T = \omega/P$ As seen in FIG. 4, the control unit 50 basically includes a display 54, a microprocessor 56 and a signal receiving unit 58. While the display 54, the microprocessor 56 and the signal receiving unit 58 are illustrated as being disposed in a single housing on the handlebar of the bicycle 10 in FIG. 1, these components can be separated and mounted at different locations on the bicycle 10 as needed and/or desired. The battery 52 supplies electrical power to the translation detecting structure 32 and the orientation detector 34 via the communication unit 46 in the first embodiment. The battery 52 also supplies electrical power to the control unit 50 in the first embodiment. It will be apparent from this disclosure that other powers sources can be used as needed and/or desired for supplying the necessary electrical power to the various components.

In the first embodiment, the communication unit 46 and the control unit 50 are separate members in which data is communicated from the communication unit 46 to the control unit 50 for displaying to the rider and/or for use in an automatic shifting system or other bicycle systems. However, the communication unit 46 and the control unit 50 can be integrated into a single unit as needed and/or desired. Moreover, while the communication unit 46 is illustrated as including a calculation circuit, it will be apparent from this disclosure that the communication unit 46 can translate the signals from the translation detecting structure 32 to the control unit 50 (e.g., a cycle computer or a controller) via wireless communications or a wire such that some or all of the calculations are performed by the control unit 50. In other words, the signal receiving unit 58 can be I/O interface that electrically connected to the communication unit 46 by an electrical cable and/or the signal receiving unit 58 can be a wireless receiver.

As seen in FIG. 4, the translation detecting structure 32 is coupled to the attachment member 30 such that the translation detecting structure 32 senses strain on the attachment member 30 in a first strain measurement direction D1 and in a second strain measurement direction D2 that is nonparallel to the first strain measurement direction D1. In the first illustrated embodiment, the translation detecting structure 32 includes a first translation sensor 61 and a second translation sensor 62. The first translation sensor 61 senses strain on the attachment member 30 in the first strain measurement direction D1. The second translation sensor 62 senses strain on the attachment member 30 in the second strain measurement direction D2. In the first illustrated embodiment, the first and second translation sensors 61 and 62 are individual sensors that are spaced apart from each other. In the first illustrated embodiment, for example, the first and second translation sensors 61 and 62 are either a strain gauge or a semiconductor sensor, or a combination thereof. A semiconductor sensor has four strain measurement elements which form a bridge circuit for sensing two strain measurement directions. Since a semiconductor sensor can sense two strain measurement directions, it is possible to eliminate one of the first and second translation sensors 61 and 62 to reduce costs. For reducing the overall costs of manufacturing the bicycle force sensing device 14, it is preferably for the first and second translation sensors 61 and 62 to each only include a single strain measurement element, respectively. However, for improved performance and functions, it is preferably for the first and second translation sensors 61 and 62 to each include at least two strain measurement elements, respectively. The strain in the main body 36 in the first strain measurement directions D1 is proportional to a force of pedaling in the first strain measurement directions D1. The strain in the main body 36 in the second strain measurement directions D2 is proportional to a force of pedaling in the second strain measurement directions D2. By sensing the strain in the main body 36 in both the first and second strain measurement directions D1 and D2, the force sensing device 14 can merge the result of the first and second translation sensors 61 and 62 to obtain the information of a force of pedaling and a direction of the pedaling. The relationships between the strains detected by the translation sensors 61 and 62 and the pedaling force are predetermined.

As seen in FIG. 4, for example, the first and second translation sensors 61 and 62 are arranged with respect to the attachment member 30 such that the first and second strain measurement directions D1 and D2 are substantially (i.e., within ten degrees) perpendicular to each other. In the first embodiment, the first and second translation sensors 61 and 62 are mounted on the inboard side of the main body 36 facing towards the bottom bracket hanger 26 of the bicycle 10. While the first and second translation sensors 61 and 62 are disposed between the main body 36 and the adaptor 38 in the first embodiment, one or both of the first and second translation sensors 61 and 62 can be disposed on the outboard side of the main body 36 so as to be facing away from the adaptor 38. The first and second translation sensors 61 and 62 are each retained in a recess of the main body 36 using a resin for providing a waterproof seal. When the first and second translation sensors are disposed on opposite side of the adaptor 38, those are covered by a cover member.

The first and second translation sensors 61 and 62 are arranged with respect to the attachment member 30 such that the first and second strain measurement directions D1 and D2 passes through the rotation axis A of the crank axle 16. Preferably, the first and second translation sensors 61 and 62 are arranged with respect to the attachment member 30 such that at least one the first and second strain measurement directions D1 and D2 lie in a single predetermined plane P (FIG. 2), which is substantially perpendicularly arranged with respect to the rotation axis A of the crank axle receiving opening of the attachment member 30.

The translation detecting structure 32 is not limited to the particular arrangement shown in FIG. 4. The first and second translation sensors 61 and 62 can be arranged with respect to the attachment member 30 such that the first and second strain measurement directions D1 and D2 are offset from the rotation axis A of the crank axle 16. While the first and second strain measurement directions D1 and D2 are preferably arranged at an angle of 90°, the angle between the first and the second strain measurement directions D1 and D2 is not limited to 90° or substantially 90°. The angle between the first and the second strain measurement directions D1 and D2 can be any angle that allows the results of the first and second translation sensors 61 and 62 to be used to obtain information of a pedaling force and a pedaling direction applied to the crank axle 16. Also the first and second translation sensors 61 and 62 can be mounted on opposite sides of the main body such that the first strain measurement direction D1 lies in a first predetermined plane, which is substantially perpendicularly arranged with respect to the rotation axis A and the second strain measurement direction D2 lies in a second predetermined plane, which is substantially perpendicularly arranged with respect to the rotation axis A. The translation detecting structure 32 is arranged with respect to the attachment member 30 such that the first and second strain measurement directions D1 and D2 extends along predetermined planes which are not perpendicularly (angled by up to 15 degrees) arranged with respect to the rotation axis A of the crank axle 16.

The orientation detector 34 is coupled to the attachment member 30 such that the orientation detector 34 detects an orientation of the attachment member 30 with respect to the bicycle frame 24. In the illustrate embodiments, the orientation detector 34 includes an acceleration sensor. However, other types of orientation detectors can be used. The orientation detector 34 detects a predetermined (gravity) direction. The positions of the orientation detector 34 and the first and second translation sensors 61 and 62 are predetermined with respect to the main body 36. Thus, based on the detecting result of position of the orientation detector 34, the first and the second strain measurement directions D1 and D2 of the first and second translation sensors 61 and 62 can be easily determined with respect to the bicycle frame 24. In other words, the bicycle force sensing device 14 can be easy to attach to the bottom bracket hanger 26 of the bicycle frame 24, because the user do not be concerned with the orientations of the first and second translation sensors 61 and 62 with respect to the bicycle frame 24. Rather, the user can attach the bicycle force sensing device 14 to the bottom bracket hanger 26 of the bicycle frame 24 in any orientation, because the orientations of the first and second translation sensors 61 and 62 with respect to the bicycle frame 24 can be determined with the orientation detector 34.

Optionally, a first dust seal or cover 70 is provided to cover the first bearing unit 40, and a second dust seal or cover 72 is provided to cover the second bearing unit 42. Since the orientation detector 34 and the first and second translation sensors 61 and 62 are position between the main body 36 and the adaptor 38, it is not necessary to provide a cover for the orientation detector 34 and the first and second translation sensors 61 and 62. However, if the orientation detector 34 and the first and second translation sensors 61 and 62 were mounted on an exterior surface of the main body 36, then the first dust seal or cover 70 can be configured to also cover the orientation detector 34 and the first and second translation sensors 61 and 62 as needed and/or desired. Alternatively, a separate cover can be provided for covering the orientation detector 34 and the first and second translation sensors 61 and 62. A dust tube 74 is also optionally provided between the adaptors 33 and 35 to form a seal within the bottom bracket hanger 26 as needed and/or desired.

Figure 6:
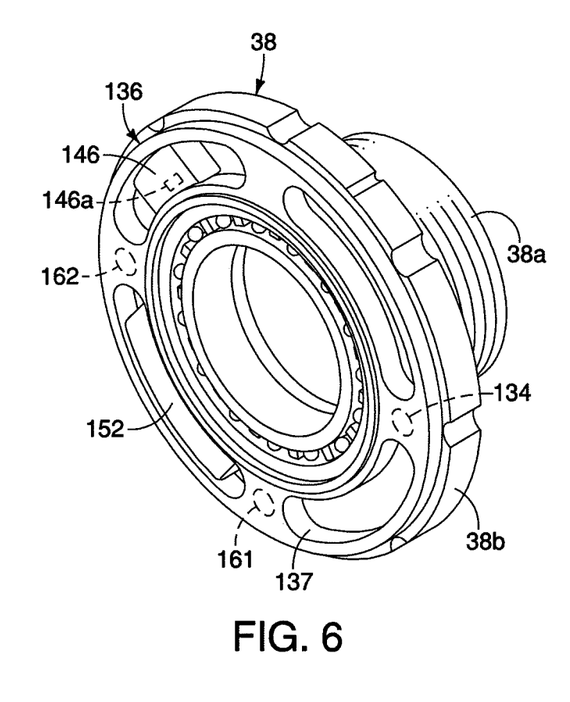
FIG. 6 is a perspective view of the main body and the adaptor member in accordance with a second embodiment.

As seen in FIG. 6, a force sensing device is illustrated in accordance with a second embodiment. This force sensing device of the second embodiment is identical to the force sensing device 14, discussed above, except that a modified main body 136 is used that has a communication unit 146 and a battery 152 supported on the modified main body 136. The modified main body 136 is used with the adaptor 38 of the first embodiment. The modified main body 136 is a bridge body type in which the intermediate area of the modified main body 136 between the inner and outer portions is provided with arc shaped through openings 137. By configuring the modified main body 136 as a bridge body type, the main body 136 can accommodate the communication unit 146 and the battery 152 in the through openings 137. The main body 136 is fixedly mounted to the adaptor 38 by a press fit. Also in this second embodiment, the communication unit 146 includes a wireless transmitter 146a that wireless communications with the receiving unit 58 of the control unit 50. Similar to the first embodiment, the main body 136 includes an orientation detector 134, a first translation sensor 161 and a second translation sensor 162. The orientation detector 134, the first translation sensor 161 and the second translation sensor 162 are electrically connected to the communication unit 146 by wires (not shown) and are identical to the orientation detector 34, the first translation sensor 61 and the second translation sensor 62 of the first embodiment, respectively.

Figure 7:
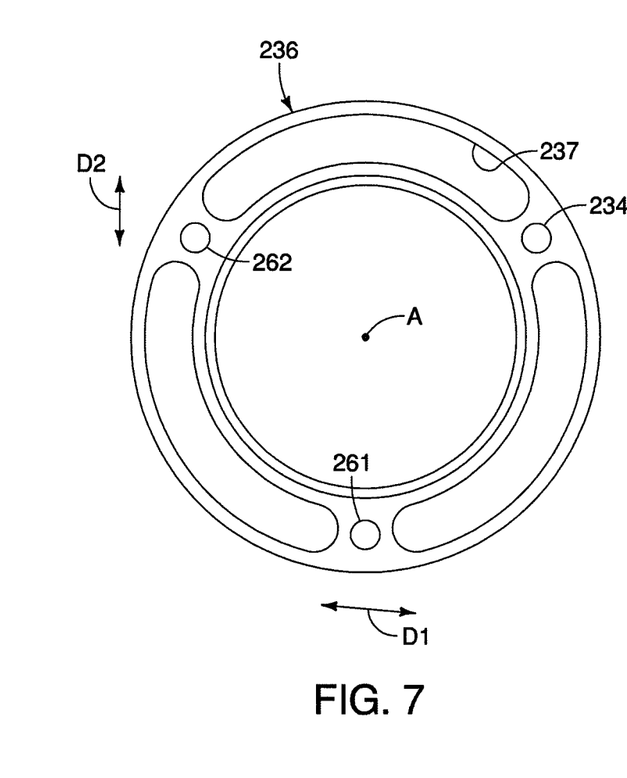
FIG. 7 is a side elevational view of a main body in accordance with an alternative configuration.
Figure 8:
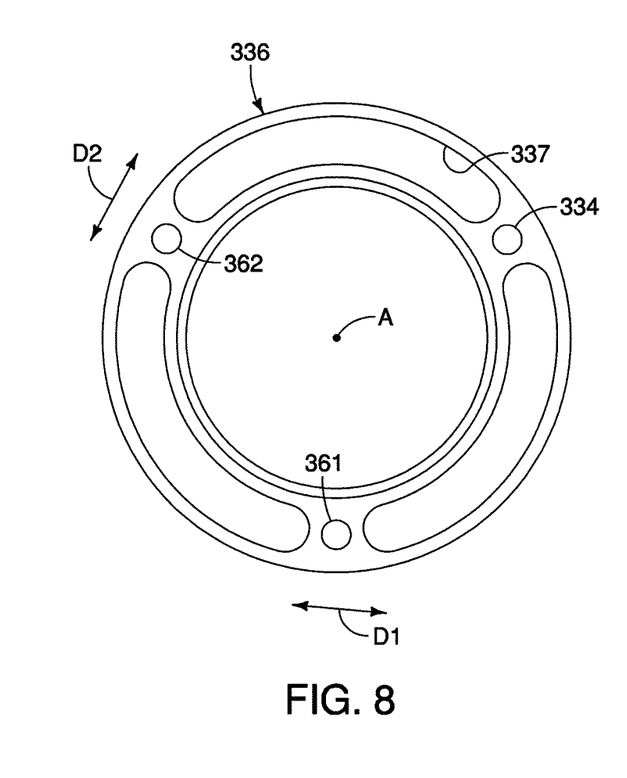
FIG. 8 is a side elevational view of a main body in accordance with another alternative configuration.

As seen in FIGS. 7 and 8, two alternative main bodies 236 and 336 are illustrated for use with the adaptor 38 of the first embodiment. In other words, the main bodies 236 and 336 are used in place of the main body 36 on the bicycle force sensing device 14. The main bodies 236 and 336 are bridge body types that are press fitted into the adaptor 38. Thus, the main bodies 236 and 336 have arc shaped through openings 237 and 337, respectively. These through openings 237 and 337 can accommodate the communication unit 146 and the battery 152 similar to the through openings 137 of FIG. 6. Similar to the first embodiment, the main bodies 236 and 336 includes an orientation detector 234 or 334, a first translation sensor 261 or 361 and a second translation sensor 262 or 362. The orientation detectors 234 and 334, the first translation sensors 261 and 361 and the second translation sensors 262 and 362 are electrically connected to the communication unit 46 by wires (not shown) and are identical to the orientation detector 34 and the first translation sensor 61 and the second translation sensor 62 of the first embodiment, respectively, except for their detection orientations D1 and D2 have been changed as illustrated. In FIG. 8, the first and second strain measurement directions D1 and D2 extends along predetermined planes which are not perpendicularly (angled by up to 15 degrees) arranged with respect to the rotation axis A.

Figure 9:
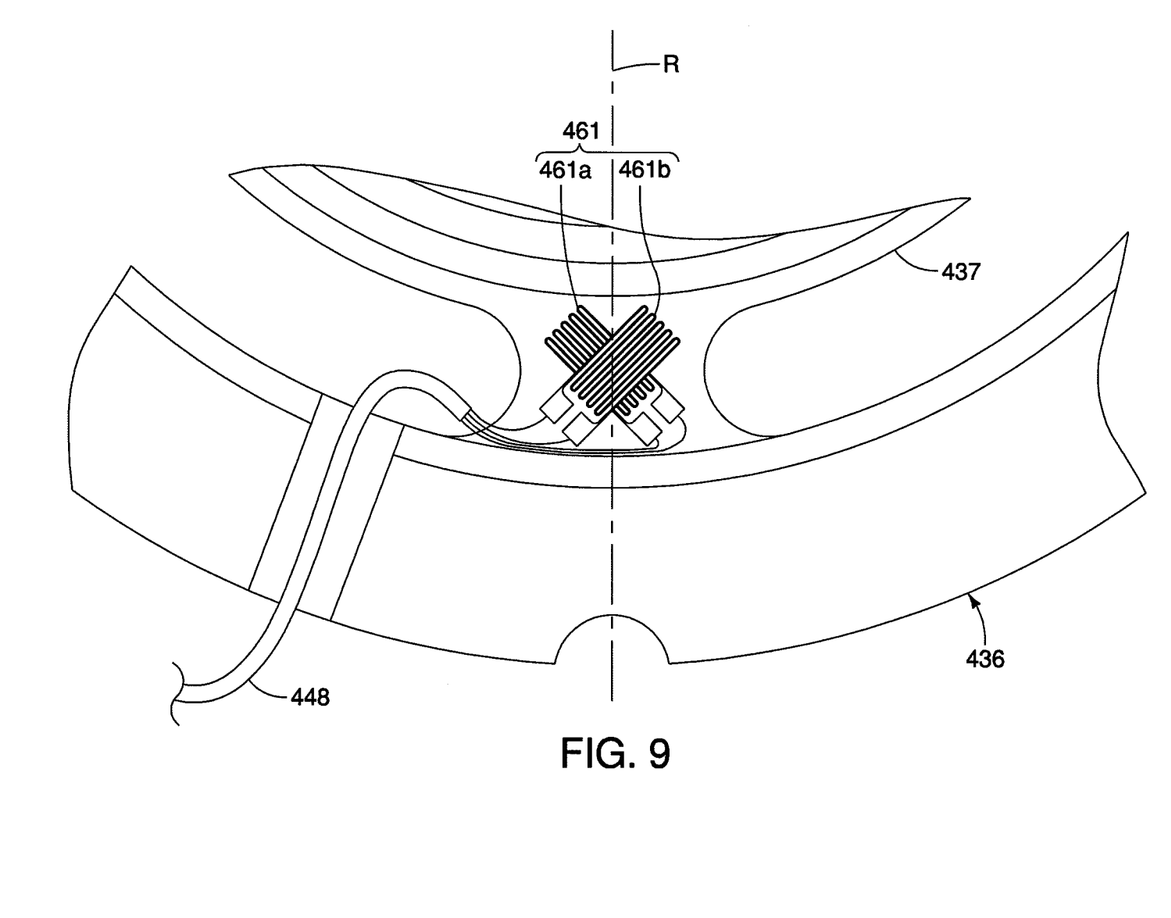
FIG. 9 is a side elevational view of a main body in which the translation sensors are formed of a pair of strain gauges.

Referring now to FIG. 9, a portion of a main body 436 is illustrated that includes having a single translation sensor 461 (only one shown) that detect two direction of strain. Translation sensor 461 includes a first strain measurement element 461a and a second strain measurement element 461b. The first and second strain measurement elements 461a and 461b are preferably identical to one another, except for their orientations. Preferably, the first and second strain measurement elements 461a and 461b are arranged to overlap and extend at a forty-five degree angle with respect to a plane R that coincides with the rotation axis A. The translation sensor 461 can be used to replace one or more of the translation sensors 61, 62, 161, 162, 261, 262, 361 and 362 in the prior embodiments, if needed and/or desired. The main body 436 is a bridge body type that is press fitted into the adaptor 38. Thus, the main body 436 has arc shaped through openings 437. These through openings 437 can accommodate the communication unit 146 and the battery 152 similar to the through openings 137 of FIG. 6. Each of the translation sensors 461 is electrical connected to the communication unit 46 by a wire 448. The translation sensor 461, as illustrated in FIG. 9, is discussed in more detail in U.S. Patent Publication No. 2010/0282001.

The first and second strain measurement elements 461a and 461b are conventional strain gauges sometimes referred to foil strain gauges that are fixed to the desired surface using a conventional adhesive appropriate for strain gauges. However, it should be understood from the drawings and the description herein that any of a variety of strain measuring devices can be used as needed and/or desired. Specifically, first and second strain measurement elements 461a and 461b can be replaced with other types of strain measuring devices. It should be understood from the drawings and the description herein that it is also possible to detect the strain in two directions by the translation sensor 461, if the detection circuits that are connected to the translation sensor 461 are selective changed by a microcomputer.

Figure 10:
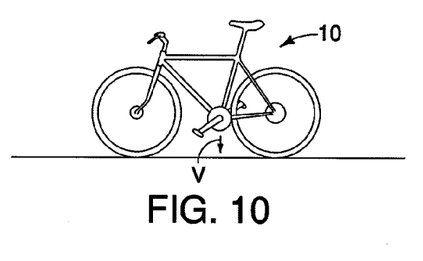
FIG. 10 is a diagrammatic view of a bicycle equipped with the bicycle force sensing device of any of the embodiments, with the bicycle being upright (vertically oriented) riding position on level ground and showing the orientation direction of the orientation detector.
Figure 11:
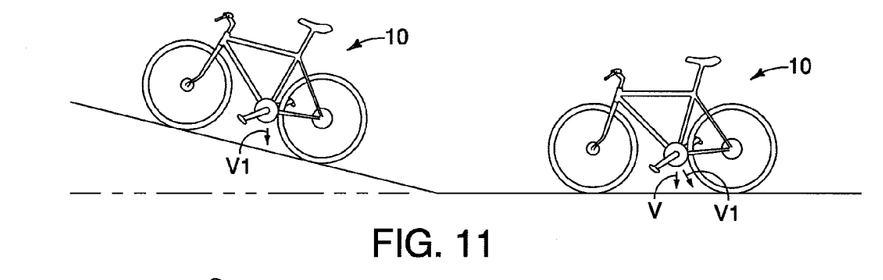
FIG. 11 is a diagrammatic view of the bicycle equipped with the bicycle force sensing device of any of the embodiments, with the bicycle being upright (vertically oriented) riding position both level ground and upward inclined ground to show a comparison of the orientation directions of the orientation detector with respect to the bicycle frame.
Figure 12:
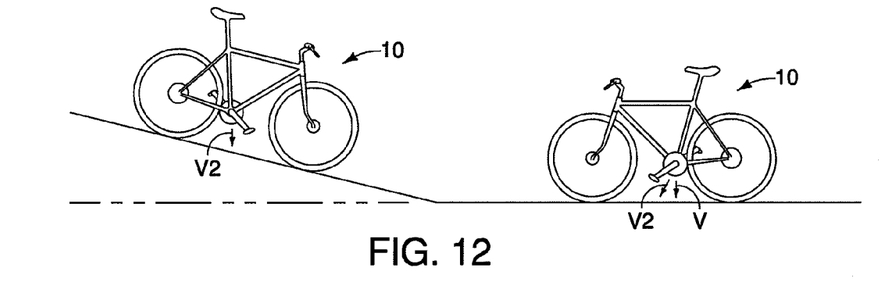
FIG. 12 is a diagrammatic view of the bicycle equipped with the bicycle force sensing device of any of the embodiments, with the bicycle being upright (vertically oriented) riding position both level ground and downward inclined ground to show a comparison of the orientation directions of the orientation detector with respect to the bicycle frame.

Referring now to FIGS. 10 to 12, setting up the bicycle force sensing device 14 will now be discussed. After the bicycle force sensing device 14 is attached to the bicycle bottom bracket hanger 26 of the bicycle frame 20, the user operates the switch 46a (e.g. a power switch, an adjust switch or mode switch) to initiate the calculation circuit of the communication unit 46. The calculation circuit of the communication unit 46 then calculates an angle of the orientation detector 34 (e.g., the acceleration sensor) with respect to a vertical direction V from a signal of the orientation detector 34. After calculation of the angle of the orientation detector 34 with respect to the vertical direction V, the calculation circuit informs the user that the calculation has ended by using the notification device 46b. If the bicycle 10 is on a horizontal surface or level ground during the setup process, then the detected angle with respect to the vertical direction V that is detected by the orientation detector 34 can be immediately used to determine the orientation of the first and second translation sensors 61 and 62 with respect to the bicycle frame 20. However, if the bicycle 10 is on an inclined surface or unlevel ground, then the calculation circuit of the communication unit 46 will not be able to correctly determine the angle of the orientation detector 34 with respect to the vertical direction V. Rather, the calculation circuit of the communication unit 46 will calculates a different angle of the orientation detector 34 (e.g., the acceleration sensor) depending on the orientation of the bicycle 10 with respect to the vertical direction V. In other words, as seen in FIG. 11, if the bicycle 10 is in an inclining position relative to the vertical direction V, then a relative vertical direction V1 will be obtained from a signal of the orientation detector 34. However, as seen in FIG. 12, if the bicycle 10 is in a declining position relative to the vertical direction V, then a relative vertical direction V2 will be obtained from a signal of the orientation detector 34. Therefore, it is necessary to compensate for an unlevel ground in determining the orientation of the orientation detector 34 with respect to the bicycle frame 20.

The user can compensate for unlevel ground by first performing a calculation with the bicycle 10 pointing in a first direction, as seen in the left part of FIG. 11. In other words, the user operates the switch 46a to initiate the calculation circuit of the communication unit 46. The calculation circuit of the communication unit 46 then calculates an angle of the orientation detector 34 with respect to the vertical direction V1 from a signal of the orientation detector 34. After calculation of the first angle of the orientation detector 34 with respect to the vertical direction V1, the calculation circuit informs the user that the calculation has ended by using the notification device 46b. Now, the user transposes (turns 180 degrees) the bicycle 10 on the ground to point in the opposite direction, as seen in the left part of FIG. 12. The user operates the switch 46a to initiate the calculation circuit of the communication unit 46 to perform a second calculation. In this way, the calculation circuit of the communication unit 46 obtains the two angles of the orientation detector 34 with respect to the relative vertical directions V1 and V2. Next, the calculation circuit of the communication unit 46 calculates the average of the first result and second result. After obtaining the average, the calculation circuit informs the user that the calculation has ended by using the notification device 46b. By using the two relative vertical directions V1 and V2, the calculation circuit of the communication unit 46 can determine the angle of the orientation detector 34 with respect to the vertical direction V when the bicycle 10 is on level ground. Since the relative positions of the first and second translation sensors 61 and 62 are fixed with respect to the orientation detector 34, the calculation circuit of the communication unit 46 can easy calculate the angle of the first and second translation sensors 61 and 62 with respect to the bicycle frame 20.

While only selected embodiments have been chosen to illustrate the present invention, it will be apparent to those skilled in the art from this disclosure that various changes and modifications can be made herein without departing from the scope of the invention as defined in the appended claims. Components that are shown directly connected or contacting each other can have intermediate structures disposed between them, unless otherwise specified. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle force sensing device comprising:
    an attachment member configured to be mounted to a bicycle bottom bracket hanger and configured to receive and rotatably support a crank axle;
    a translation detecting structure coupled to the attachment member such that the translation detecting structure senses strain on the attachment member in a first strain measurement direction and in a second strain measurement direction that is nonparallel to the first strain measurement direction; and
    an orientation detector coupled to the attachment member such that the orientation detector detects an orientation of the attachment member.

2. The bicycle force sensing device according to claim 1, wherein
    the translation detecting structure includes a first translation sensor that senses strain on the attachment member in the first strain measurement direction and a second translation sensor that senses strain on the attachment member in the second strain measurement direction, the first and second translation sensors being individual sensors.

3. The bicycle force sensing device according to claim 2, wherein
    each of the first and second translation sensors includes a plurality of strain measurement elements.

4. The bicycle force sensing device according to claim 1, wherein
    the translation detecting structure includes a single sensor having at least two strain measurement elements.

5. The bicycle force sensing device according to claim 1, wherein
    the attachment member includes a first portion configured to be attached to the bicycle bottom bracket hanger and a second portion having the first and second sensor attached thereto.

6. The bicycle force sensing device according to claim 5, wherein
    the second portion is configured to be disposed outside of the bicycle bottom bracket hanger.

7. The bicycle force sensing device according to claim 1, wherein
    the translation detecting structure includes either at least a strain gauge or a semiconductor sensor.

8. The bicycle force sensing device according to claim 1, wherein
    the translation detecting structure is arranged with respect to the attachment member such that the first and second strain measurement directions are perpendicularly arranged with respect to each other.

9. The bicycle force sensing device according to claim 1, wherein
    the translation detecting structure is arranged with respect to the attachment member such that at least one the first and second strain measurement directions extends along a predetermined plane which is substantially perpendicularly arranged with respect to a center axis of a crank axle receiving opening of the attachment member.

10. The bicycle force sensing device according to claim 1, wherein
    the translation detecting structure is arranged with respect to the attachment member such that the first and second strain measurement directions extends along predetermined planes which are not perpendicularly arranged with respect to a center axis of a crank axle receiving opening of the attachment member.

11. The bicycle force sensing device according to claim 1, wherein
    the orientation detector includes an acceleration sensor.

12. The bicycle force sensing device according to claim 1, further comprising
    a communication unit operatively coupled to the translation detecting structure and the orientation detector such that signals from the translation detecting structure and the orientation detector are received by the communication unit.

13. The bicycle force sensing device according to claim 12, wherein
    the communication unit is supported on the attachment member.

14. The bicycle force sensing device according to claim 12, wherein
    the communication unit is separate from the attachment member.

15. The bicycle force sensing device according to claim 12, wherein
    the communication unit includes a calculation circuit.

* * * * *